Jan. 14, 1941.   O. F. CARTER   2,228,946
LIVESTOCK CHUTE ATTACHMENT FOR TRUCKS
Filed May 3, 1939   3 Sheets-Sheet 1
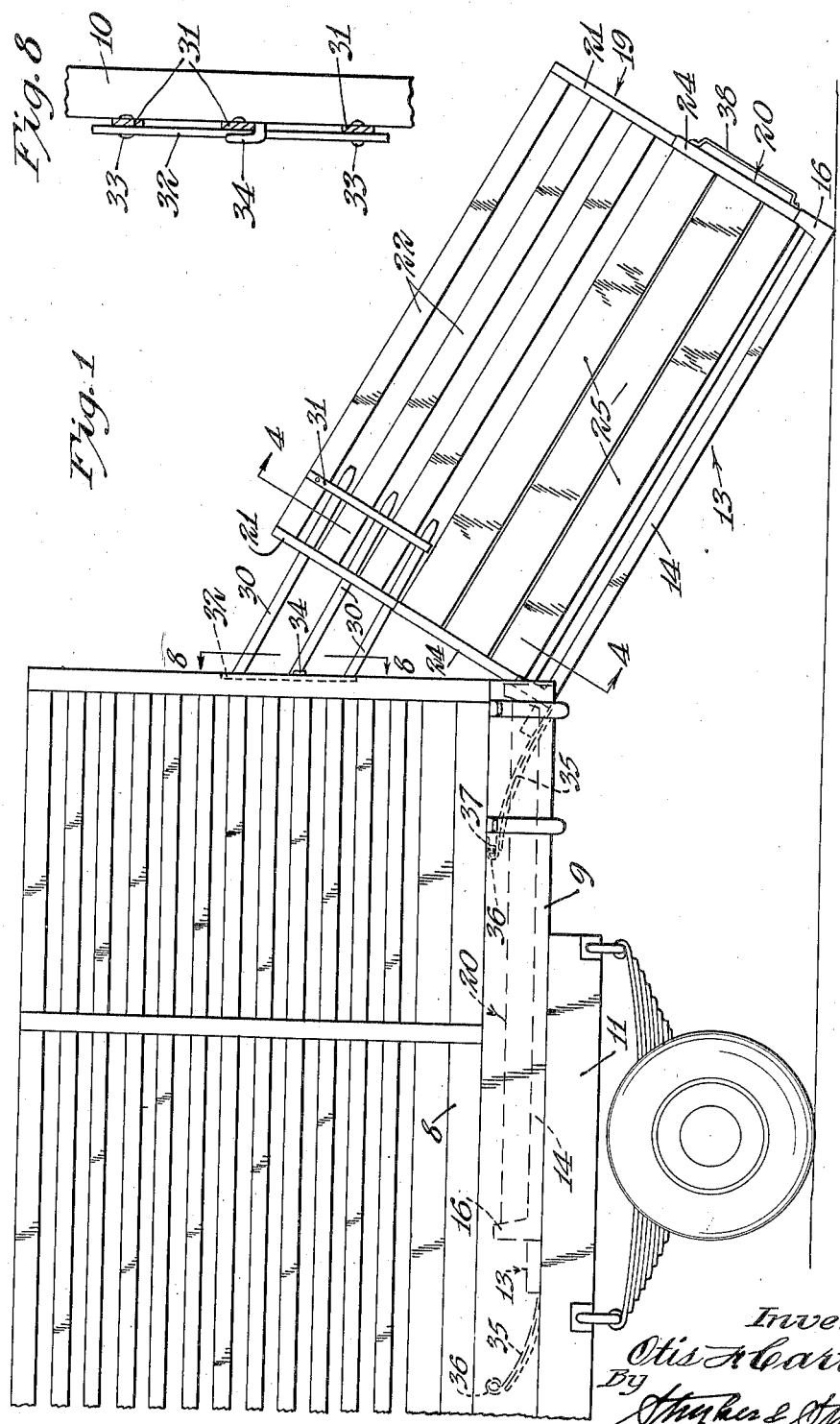

Jan. 14, 1941.  O. F. CARTER  2,228,946
LIVESTOCK CHUTE ATTACHMENT FOR TRUCKS
Filed May 3, 1939  3 Sheets-Sheet 2
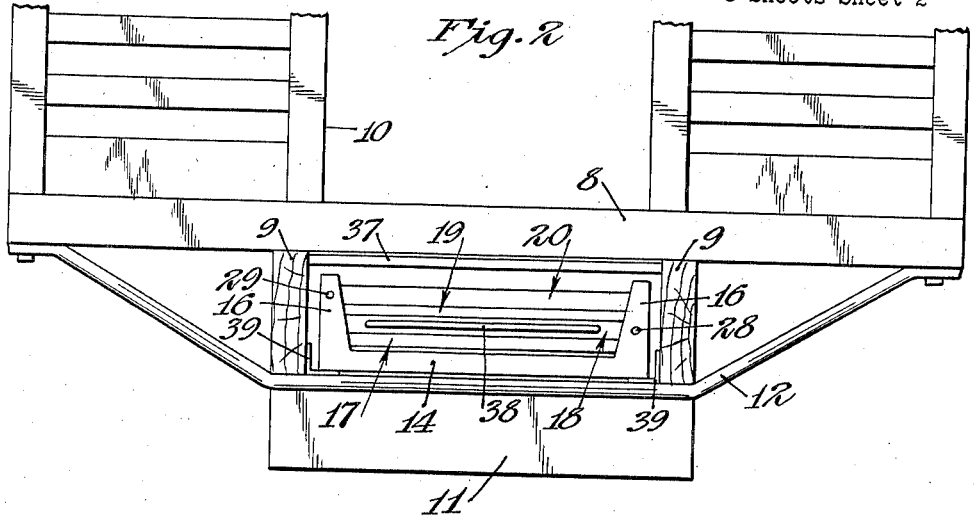
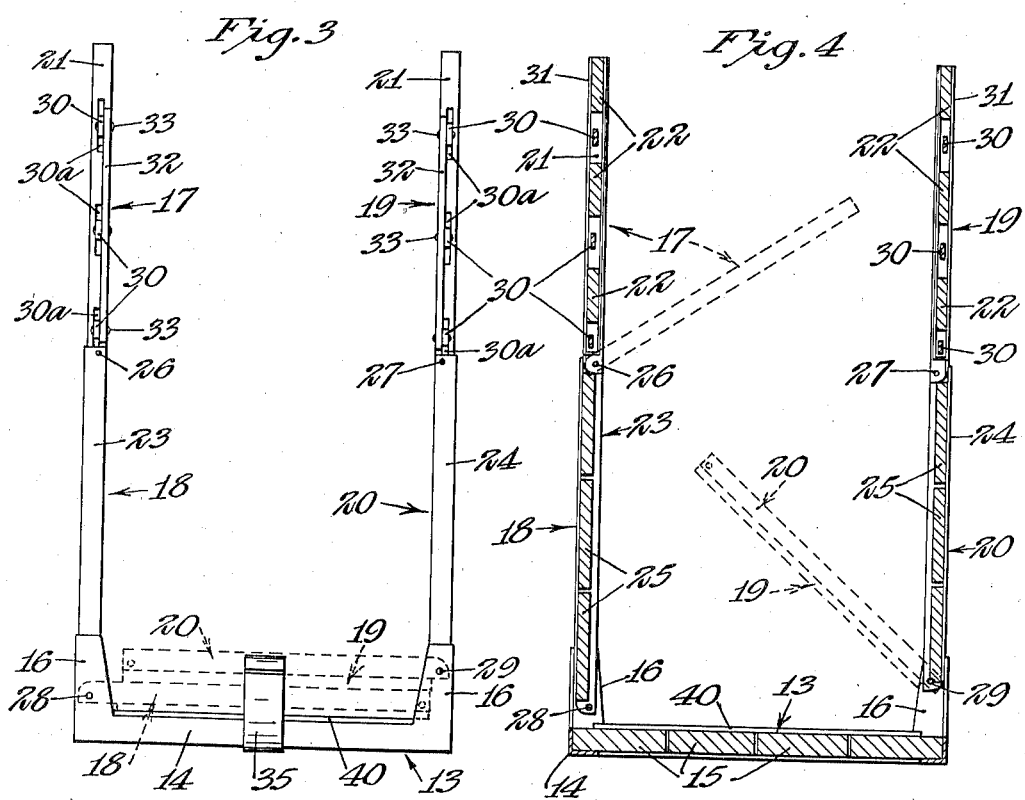
Inventor
Otis F. Carter
By Stryker & Stryker
Attorneys Jan. 14, 1941.  O. F. CARTER  2,228,946
LIVESTOCK CHUTE ATTACHMENT FOR TRUCKS
Filed May 3, 1939.  3 Sheets-Sheet 3
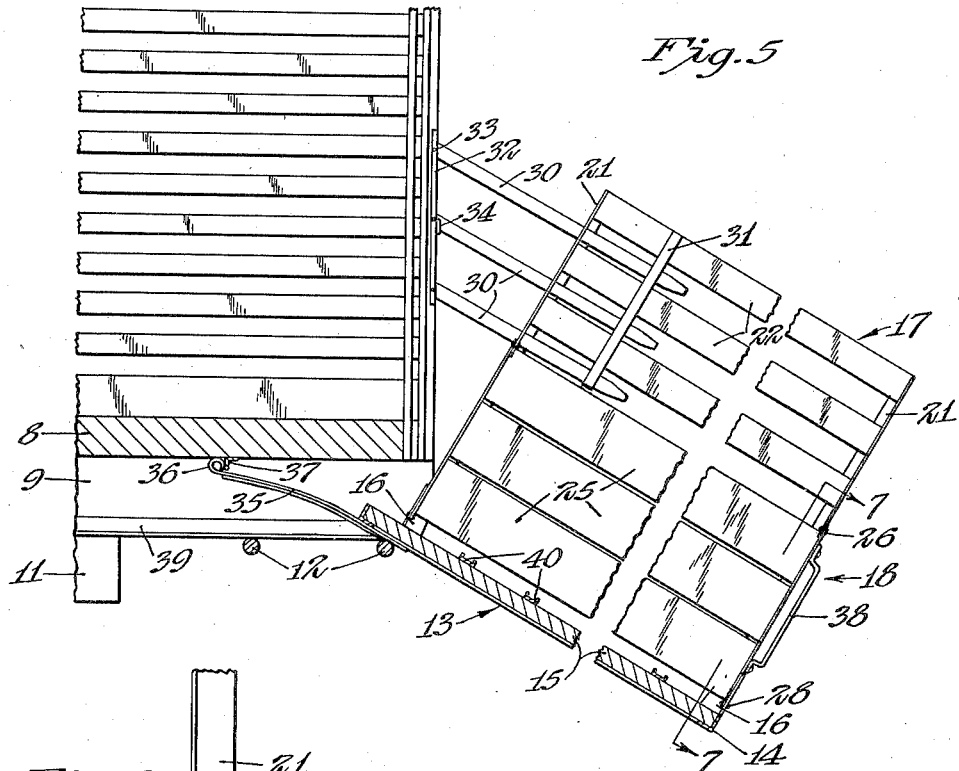
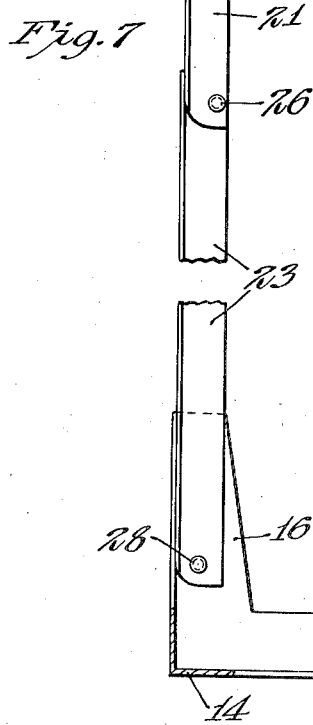
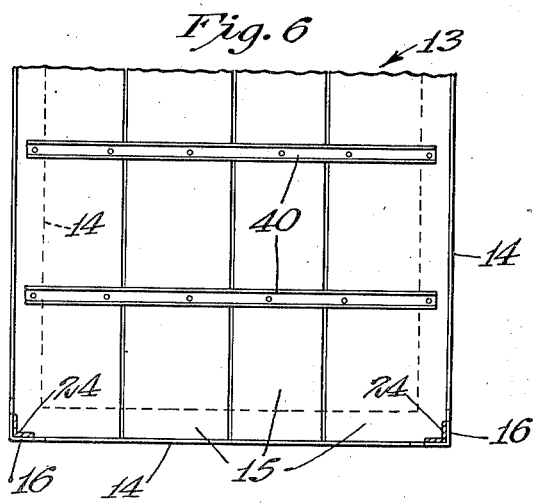
Inventor
Otis F. Carter
By Stryker & Stryker
Attorneys Patented Jan. 14, 1941

2,228,946

UNITED STATES PATENT OFFICE 2,228,946

LIVESTOCK CHUTE ATTACHMENT FOR TRUCKS

Otis F. Carter, St. Peter, Minn.

Application May 3, 1939, Serial No. 271,471

9 Claims. (Cl. 214—85)

This invention relates to a chute or ramp adapted to be extended from a cattle truck for the loading and unloading of livestock and so constructed that it may be quickly and easily retracted beneath the truck floor when not in use.

Heretofore the portable chutes provided for loading and unloading livestock have not been entirely satisfactory either because they have been difficult to erect and store on the trucks or because they have had side openings which have allowed the stock to injure themselves or escape. To prevent the escape of the livestock during the loading, the sides of the chute must be at least four feet in height and must be substantially solid or unbroken for a distance of two or more feet from the floor. I have found that substantial openings between the wall members near the floor allow the stock to obtain a foothold which enables them to climb the side walls or to project their legs through the openings with resulting injuries and delays. Further difficulty is encountered because of the fact that the only conveniently available space for storing a chute on most cattle trucks is less than thirty inches in width and six to seven inches in height.

It is an object of this invention to provide a novel chute of this class which has strong, rigid and adequately continuous and high side walls permanently attached to and quickly and easily foldable upon the floor or ramp of the chute.

Another object is to provide in a chute of this class end extensions for the sides adapted to fill in the gap between the sides and tail gate of the truck when the chute is in the inclined position for use.

A further object is to provide a chute of this kind with resilient means for relieving the operator of part of the weight of the chute when the latter is moved to and from the extended or inclined position.

Other objects will appear and be more fully pointed out in the following specification and claims.

Referring to the drawings:

Figure 1 is a side elevation of my improved chute attached to a cattle truck of common type and in extended position;

Fig. 2 is a rear end view of the chute and adjacent portion of the truck, showing the chute in retracted position;

Fig. 3 is a front end view of the chute, detached from the truck;

Fig. 4 is a cross section taken on the line 4—4 of Fig. 1;

Fig. 5 is a fragmentary, longitudinal section of the chute and adjacent portion of the truck;

Fig. 6 is a fragmentary plan view of the floor of the chute with the sides removed;

Fig. 7 is a section taken on the line 7—7 of Fig. 5, on a somewhat larger scale, and showing the steel frame members only at one of the corners, the wooden wall and floor members being omitted, and Fig. 8 is a section through the side extension bars at one side taken on the line 8—8 of Fig. 1.

My device is illustrated on a truck having a floor 8 supported on a pair of main longitudinal body members 9 and having a tail gate opening 10 through which the livestock may be loaded and unloaded. The main frame 11 of the truck supports the body members 9 and the overhanging rear ends of the latter are further supported by cross bars 12.

My improved chute has a floor indicated generally by the numeral 13, consisting of a rectangular metal frame 14 and floor planks 15, the frame being constructed from angle bars. Projecting up from each corner of the frame and integral therewith is an angular bracket 16 to which one of the side frame members of the chute is hingedly fastened. The sides comprise four rigid, rectangular panels indicated respectively by the numerals 17, 18, 19 and 20. The panels 17 and 19 are similar, each consisting of a pair of spaced parallel angle bars 21 rigidly connecting longitudinal slats 22 at the ends of the latter.

The lower panels 18 and 20 of the sides are formed respectively from pairs of angle bars 23 and 24 and longitudinally extending boards 25. The bars 21 are adapted to extend in continuation of the bars 23 and 24 and are pivotally connected thereto by bolts 26 and 27. The lower ends of the bars 21 overlap the bars 23 and 24 so that the panels 17 and 19 may be swung inward but cannot swing outward beyond the vertical positions illustrated in Figs. 3, 4 and 7. The angle members 23 and 24 are pivotally joined at their lower ends to the angle brackets 16 by bolts 28 and 29 respectively so that the latter may be swung inward from the vertical position but not outward therefrom. The bolts 28 for pivotally supporting the members 23 are located at a lower elevation than the bolts 29 supporting the members 24 in order that the wall panels 17 and 18 may be pivoted to lie horizontally beneath the panels 19 and 20 when the latter are collapsed, as indicated in dotted lines in Fig. 3 and in full lines in Fig. 2.

Slidably mounted on each of the panels 17 and 19 is a series of parallel bars 30 adapted to be extended to fill in the triangular openings at the upper ends of the chute sides when the latter are in the extended, inclined position shown in Fig. 5. These bars 30 extend through vertically elongated slots 30a (Fig. 3) in the angle members 21 and are guided in the plane of the boards 22 by metal bands 31 secured to the inner and outer faces respectively of the boards and in spaced parallel relation to the angle bars 21. The front ends of the bars 30 are joined together by a cross member 32 and pivot bolts 33, as shown in Figs. 3 and 5. By this arrangement the member 32 may be moved from its vertical position shown in Fig. 5 to an inclined position against the outer end surface of the angle member 21 when the bars 30 are retracted. When the bars 30 are extended the cross member 32 is placed in engagement with a hook 34, projecting from the side of the tail gate opening 10, as indicated in Figs. 1, 5 and 8.

Projecting centrally from the front end of the chute floor 13 is a leaf spring 35 (Figs. 1, 3 and 5) having a head 36 formed on its free end to engage the bottom of the truck floor 8. The rear end of this spring is rigidly bolted to the bottom of the floor 13 and the projecting portion, when free, curves upward as shown in Fig. 3 and in the retracted chute position indicated in dotted lines in Fig. 1. As the chute is withdrawn from the retracted position and its rear end is lowered toward the inclined position, the head 36 on the spring 35 engages the truck floor to resiliently oppose the lowering of the rear end of the chute. This relieves the operator of a substantial part of the weight of the chute and facilitates movement of the chute to and from inclined position. Outward movement of the chute is limited by engagement of the head 36 with a stop bar 37 secured to the bottom of the truck floor. Movement of the chute is also facilitated by providing a handle 38 extending along the rear end of the side panel 18, as shown in Figs. 1 and 2. When the sides of the chute are collapsed the handle 38 extends horizontally and may be readily grasped by the operator to extend and retract the chute. Lifting force applied to the handle 38 is transmitted to the angle brackets 16 by the bolts 28 and 29, the weight of the panels 19 and 20 being sufficient to retain the panel 18 in the horizontal position against the force so applied. Horizontally extending rails 39 are provided to slidably support the chute in its horizontal, retracted position, these rails being secured to the inner faces of the body frame members 9. At suitable intervals on the chute floor 13 cleats 40 are fastened to guard against slipping of the feet of the livestock on the inclined surface.

My improved chute is rendered unusually rugged, durable and compact by the complete steel frame supporting all wood members and it may be moved to or from the retracted position quickly and easily. Assuming that it is in the extended position shown in Fig. 1, when it is desired to move the chute to traveling position, the bars 30 are first raised to disengage the cross members 32 from engagement with the hooks 34. These bars are then retracted so that the members 32 extend parallel to and in contact with the end members 21 of the sides. This frees the sides for folding and the panels 17 and 18 are successively pivoted inward so that the panel 17 lies against the floor 13 beneath the panel 18. Next, the panels 19 and 20 are similarly folded on top of the panel 18 and then the operator grasps the handle 38 and raises the rear end of the chute. This lifting movement is facilitated by operation of the spring 35. Finally the folded chute is slid beneath the truck floor on the rails 39, as indicated in dotted lines in Fig. 1 and in full lines in Fig. 2.

In height the several panels 17, 18, 19 and 20 are substantially equal and they all fit within the rectangle defined by the corner brackets 16. It will be noted that the lower panels 18 and 20 of the sides have no openings therein in which the livestock could get a foothold or through which the legs of the animal could be projected to their injury. The sides are approximately four feet in height so that there is no danger of the escape of cattle or other stock over the sides and yet the sides may be retracted almost instantaneously to occupy space only slightly in excess of two feet in width and six inches in height. This makes it possible for the structure to pass readily into the available receptacle between the longitudinal members 9 of the truck body.

Having described my invention, what I claim as new and desire to protect by Letters Patent is:

1. In a livestock chute for attachment to a truck having a gate opening and a chute receptacle beneath said opening, a chute floor adapted to extend obliquely down from said receptacle and rectangular sides each comprising a plurality of rectangular panels, the panels for each side being hingedly connected to said floor and to each other to be folded one upon another on the upper surface of said floor, said sides and floor being retractable into said receptacle beneath said gate opening and the panels adjoining said floor having substantially continuous walls from top to bottom to prevent the legs of livestock from projecting therethrough.

2. In a livestock chute for attachment to a truck having a tail gate opening and a receptacle for a chute in horizontal position beneath said gate, a chute floor adapted to extend obliquely down from said receptacle and rectangular sides each comprising upper and lower rigid rectangular panels, the upper panels being hingedly connected to the lower panels respectively and the lower panels being hingedly connected to said floor to be folded one upon another on said floor, said sides and floor being retractable into said receptacle and the lower panels having substantially continuous walls from top to bottom and the height of each being substantially equal to the width of said floor.

3. In a livestock chute for attachment to a truck having a gate opening and a chute receptacle beneath said opening, a chute floor adapted to extend obliquely outward and down from said opening and sides hingedly connected to said floor and each comprising a plurality of rigid panels each substantially equal in height to the width of said floor and hingedly connected to each other to be folded one upon another on said floor, said sides and floor being retractable into said receptacle beneath said gate opening and the panels adjoining said floor having substantially continuous walls from top to bottom to prevent the legs of livestock from projecting therethrough.

4. In combination with a truck having a gate opening and a chute receptacle beneath said opening, a rectangular chute floor adapted to extend obliquely down from said receptacle and sides hingedly connected respectively to the longitudinal edges of said floor and each comprising a plurality of panels formed from longitudinally extending members rigidly secured together by cross members, the panels of each side being hingedly connected to each other to be folded one upon another on said floor, said sides and floor being retractable into said receptacle and the panels adjoining said floor having substantially continuous walls from top to bottom and the height of each being substantially equal to the width of said floor.

5. In a livestock chute for attachment to a truck having a gate opening and a chute receptacle beneath said opening, a rectangular chute floor adapted to extend obliquely down from said receptacle and sides hingedly connected respectively to the longitudinal edges of said floor and each comprising a plurality of panels formed from longitudinally extending wood members rigidly secured together at their ends by metal angle members, the angle members at each end of a side being hingedly connected to each other in overlapping relation to be folded inward onto the floor but not outward from the upright position, said sides and floor being retractable into said receptacle.

6. In a livestock chute for attachment to a truck having a gate opening and a chute receptacle beneath said opening, a rectangular chute floor adapted to extend obliquely down from said receptacle, brackets integral with the corners of said floor and projecting upward therefrom and sides extending along the longitudinal edges of said floor, pivotally connected to said brackets to fold onto said floor but confined against outward movement from the upright position with respect thereto and each side comprising a plurality of panels formed from longitudinally extending members rigidly secured together by cross members, the panels of each side being hingedly connected to each other to be folded one upon another on said floor, said sides and floor being retractable into said receptacle and the panels adjoining said floor having substantially continuous walls from top to bottom.

7. In a livestock chute for attachment to a truck having a gate opening and a receptacle beneath said opening for a chute, the combination of a chute adapted to be extended obliquely down from said receptacle and to be moved to horizontal position within said receptacle and a leaf spring projecting from one end of said chute and engaging the truck to exert lifting force tending to raise the other end of said chute.

8. In a livestock chute for attachment to a truck having a gate opening and a receptacle for a chute beneath said opening, a chute floor and rectangular sides hingedly connected together and adapted to extend obliquely down from said receptacle, said sides being foldable onto the floor for movement to horizontal position within said receptacle, series of extensible bars mounted on said sides respectively to project at the ends thereof adjacent to said opening, a cross member pivotally connecting the bars of each series together at their outer ends, means for guiding each series of bars for longitudinal movement in the plane of a side, said bars being free for limited longitudinal movement independently of each other and fastening means on said truck adjacent to said opening to coact with said cross member in retaining said bars in extended position.

9. In a livestock chute for attachment to a truck having a gate opening and a receptacle for a chute beneath said opening, a floor and rectangular sides hingedly connected together and adapted to extend obliquely down from said receptacle, said sides being foldable onto the floor for movement to horizontal position within said receptacle, groups of substantially parallel, extensible bars mounted on said sides respectively to project at the ends thereof adjacent to said opening, a cross member joining the bars of each group together at their outer ends, means for guiding the bars of each group for longitudinal sliding movement in the planes of the sides respectively, the several bars having pivotal connections with said cross members and fastening means on said truck adjacent to said opening to coact with said cross members in retaining said bars in extended position and the sides of the chute in upright position.

OTIS F. CARTER.